US008874468B2

(12) United States Patent
Gargi

(10) Patent No.: US 8,874,468 B2
(45) Date of Patent: Oct. 28, 2014

(54) MEDIA ADVERTISING

(75) Inventor: Ullas Gargi, Los Altos, CA (US)

(73) Assignee: Google Inc., Mountain View, CA (US)

( * ) Notice: Subject to any disclaimer, the term of this patent is extended or adjusted under 35 U.S.C. 154(b) by 2260 days.

(21) Appl. No.: 11/738,292

(22) Filed: Apr. 20, 2007

(65) Prior Publication Data
US 2008/0262912 A1 Oct. 23, 2008

(51) Int. Cl.
*G06Q 30/00* (2012.01)
*G06Q 30/02* (2012.01)
(52) U.S. Cl.
CPC ............ *G06Q 30/02* (2013.01); *G06Q 30/0241* (2013.01)
USPC ........... 705/14.4; 702/179; 707/749; 715/726
(58) Field of Classification Search
CPC ... G06F 17/30; G06F 17/18; G06F 17/30864; G11B 27/034; G05B 23/024
USPC ............................. 715/726; 702/179; 707/749
See application file for complete search history.

(56) References Cited

U.S. PATENT DOCUMENTS

| 6,286,005 | B1 * | 9/2001 | Cannon ...................... 705/14.66 |
| 6,366,296 | B1 | 4/2002 | Boreczky et al. |
| 6,728,753 | B1 * | 4/2004 | Parasnis et al. ............... 709/203 |
| 7,610,597 | B1 * | 10/2009 | Johnson et al. ................. 725/32 |
| 7,676,405 | B2 * | 3/2010 | Steelberg et al. ............... 705/28 |
| 2004/0006606 | A1 * | 1/2004 | Marotta et al. ................ 709/219 |
| 2004/0221322 | A1 | 11/2004 | Shen et al. |
| 2005/0264703 | A1 * | 12/2005 | Aoki ............................. 348/701 |
| 2007/0288518 | A1 * | 12/2007 | Crigler et al. ............. 707/104.1 |
| 2008/0066107 | A1 | 3/2008 | Moonka et al. |
| 2008/0215290 | A1 * | 9/2008 | Zweben et al. ............... 702/179 |

FOREIGN PATENT DOCUMENTS

| CN | 1728781 A | 2/2006 |
| CN | 1883198 A | 12/2006 |
| EP | 1 286 278 A2 | 2/2003 |
| WO | WO 99/52285 A1 | 10/1999 |
| WO | WO 01/58154 A2 | 8/2001 |
| WO | WO 03/050731 A2 | 6/2003 |
| WO | WO 2005/010702 A2 | 2/2005 |
| WO | WO 2006/127645 A2 | 11/2006 |

OTHER PUBLICATIONS

International Preliminary Report on Patentability from corresponding application PCT/US2008/060997, dated Oct. 29, 2009.
PCT International Search Report and Written Opinion for International Application No. PCT/US2008/060997, dated Oct. 13, 2008.
Cooper et al., "Video Segmentation via Temporal Pattern Classification," *IEEE Transactions on Multimedia*, 9(3):610-618 (Apr. 2007).

(Continued)

*Primary Examiner* — John Van Bramer
*Assistant Examiner* — Stacie Gatling
(74) *Attorney, Agent, or Firm* — Fish & Richardson P.C.

(57) ABSTRACT

Potential content item slots (e.g., ad slots) in a media (e.g., video, audio, or both) are identified, and each content item slot is associated with a weight that indicates a degree of potential disruption to a flow of the media when a content item (e.g., ad) is inserted in the content item slot.

26 Claims, 9 Drawing Sheets

(56) References Cited

OTHER PUBLICATIONS

Gargi et al., "Performance Characterization of Video- Shot-Change Detection Methods," *IEEE Transactions on Circuits and Systems for Video Technology*, 10(1):1-13 (Feb. 2000).

Lee, M., et al., "Automatic Video Parsing Using Shot Boundary Detection and Camera Operation Analysis," *Pattern Recognition*, 2001, 34(3):711-719.

European Search Report in EP 08 74 6424, mailed Feb. 6, 2012, 8 pages.

* cited by examiner

MEDIA ADVERTISING

TECHNICAL FIELD

This document generally relates to advertising.

BACKGROUND

Advertisements (or "ads") can be played as part of a video program. Some video programs are produced with predetermined ad slots where ads can be inserted into the video. For example, a one-hour comedy may be filmed with four 13-minute video segments to allow insertion of two minutes of ad(s) after each video segment. For videos that are produced without predetermined ad slots, the videos can be reviewed by a producer and manually tagged with video metadata to indicate the positions of ad slots.

SUMMARY

This document describes identification of media in-stream ad slots. In one aspect, in general, a computer-implemented method includes identifying potential content item slots in a media, and associating weights with each potential content item slot, each weight indicating a degree of potential disruption to a flow of the media when a content item is inserted in the content item slot.

Implementations of the method may include one or more of the following features. The media includes a video, an audio, or a combination of a video and an audio. The content item includes an ad. The content item slots include ad slots. Identifying potential content item slots include identifying video shot boundaries indicating changes in video shots within the media. Identifying potential content item slots include identifying boundaries of audio, speech, or music within the media. The method includes identifying ad slots from the potential ad slots having weights above a threshold.

The method includes assigning content items to the ad slots based on the weights. In some examples, the content items are assigned to the ad slots based on the weights and time durations of the content items. In some examples, the content items having longer time durations are assigned to content item slots associated with higher weights, and content items having shorter time durations are assigned to content item slots associated with lower weights, wherein a higher weight indicates a lower degree of potential disruption to the video flow.

In some examples, content items are assigned to the content item slots based on the weights and the percentages of text, still images, and videos in the content items. In some examples, the content items having a higher percentage of text or still images are assigned to content item slots associated with lower weights, and content items having a higher percentage of video are assigned to content item slots associated with higher weights, wherein a higher weight indicates a lower degree of potential disruption to the video flow. In some examples, a content item is assigned to one of the content item slots based on the associated weight and a similarity level between the content item and video content preceding the content item slot. In some examples, content items having a higher similarity to the video content are assigned to content item slots associated with lower weights, and assigning content items having a lower similarity to the video content to content item slots associated with higher weights, wherein a higher weight indicates a lower degree of potential disruption to the video flow.

The method includes generating video metadata having information about positions of the content item slots within the video and the weights associated with the content item slots. The method includes receiving the video from a source, and providing information about positions of the potential content item slots and associated confidence scores to the source. The method includes modifying the weights based on a rule independent of the potential disruption to the flow of the media. The rules include increasing a weight of a content item slot when the content item slot is within a predetermined time period from the beginning of the media.

In another aspect, in general, a computer-implemented method includes identifying positions within a media using a first set of rules for detecting characteristics in the media, and evaluating each of the identified positions using a second set of rules for identifying content item slots such that when content items are served in the content item slots, the disruption to the flow of the video tends to be smaller than if the content items are served outside of the ad slots.

Implementations of the method may include one or more of the following features. The content items includes ads. The content item slots include ad slots. The media includes a video, an audio, or a combination of a video and an audio. Identifying the positions includes identifying video shot boundaries. In some examples, evaluating the identified position includes determining whether there audio continuity across the identified position. In some examples, evaluating the identified position includes determining whether there is audio silence before and after the identified position. In some examples, evaluating the identified position includes determining whether there is cut or fade to black or monochrome at the identified position.

In some examples, evaluating the identified position includes determining the frequency of cut activity before and after the identified position. In some examples, evaluating the identified position includes determining a degree of similarity of video shots preceding and succeeding the identified position. In some examples, evaluating the identified position includes determining a continuity of motion preceding and succeeding the identified position. In some examples, evaluating the identified position includes determining a level of motion activity preceding and succeeding the identified position. In some examples, evaluating the identified position includes determining whether there is a gradual increase in audio volume in an audio associated with the video before the identified position. In some examples, evaluating the identified position includes determining whether there is a zoom out of a scene in the video before the identified position.

In another aspect, in general, a computer-implemented method includes receiving a media, sending the media to a media processing server, receiving media metadata provided by the media processing server, the media metadata having information about content item slots in the media and confidence scores associated with the content item slots.

Implementations of the method may include one or more of the following features. The method includes providing a user interface to allow a user to view segments of the video before and after the content item slots and modify a selection of the content item slots. The content item slots include ad slots.

In another aspect, in general, a system includes a server, which includes a storage device to store a video, and a processor to perform a first layer of video processing and a second layer of video processing to identify content item slots within the video. The first layer of video processing identifies positions in the video based on a first set of rules for identifying characteristics of video shots in the video, and the second layer of video processing evaluates the identified position to generate confidence scores for each identified position. Each confidence score indicates a potential degree of disruption to a flow of the video when a content item is served at the identified position.

Implementations of the system may include one or more of the following features. The content items include ads. The content item slots include ad slots.

In another aspect, in general, an apparatus includes a user interface to provide a user information about content item slots in a video and confidence scores associated with the video, each confidence score indicating a potential degree of disruption to a flow of the video when a content item is served at a corresponding content item slot, the user interface allowing the user to modify a selection of the content item slots and store information about the modified selection of content item slots in a storage device.

Implementations of the apparatus may include one or more of the following features. The content item includes an ad. The content item slots include ad slots.

In another aspect, in general, a system includes means for identifying potential content item slots in a video, and means for associating weights with each potential content item slot, each weight indicating a degree of potential disruption to a flow of the video when a content item is inserted in the potential content item slot.

Implementations of the system may include one or more of the following features. The content item includes an ad. The content item slots include ad slots.

The systems and techniques may include one or more of the following advantages. Content items (e.g., ads) can be played in-stream of a media (e.g., video, audio, or a combination of video and audio) without significantly disrupting the flow of the media. A publisher of the media can generate revenue from the content items (e.g., ads) without adversely affecting the experience of the person receiving the media (e.g., viewing the video or listening the audio).

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
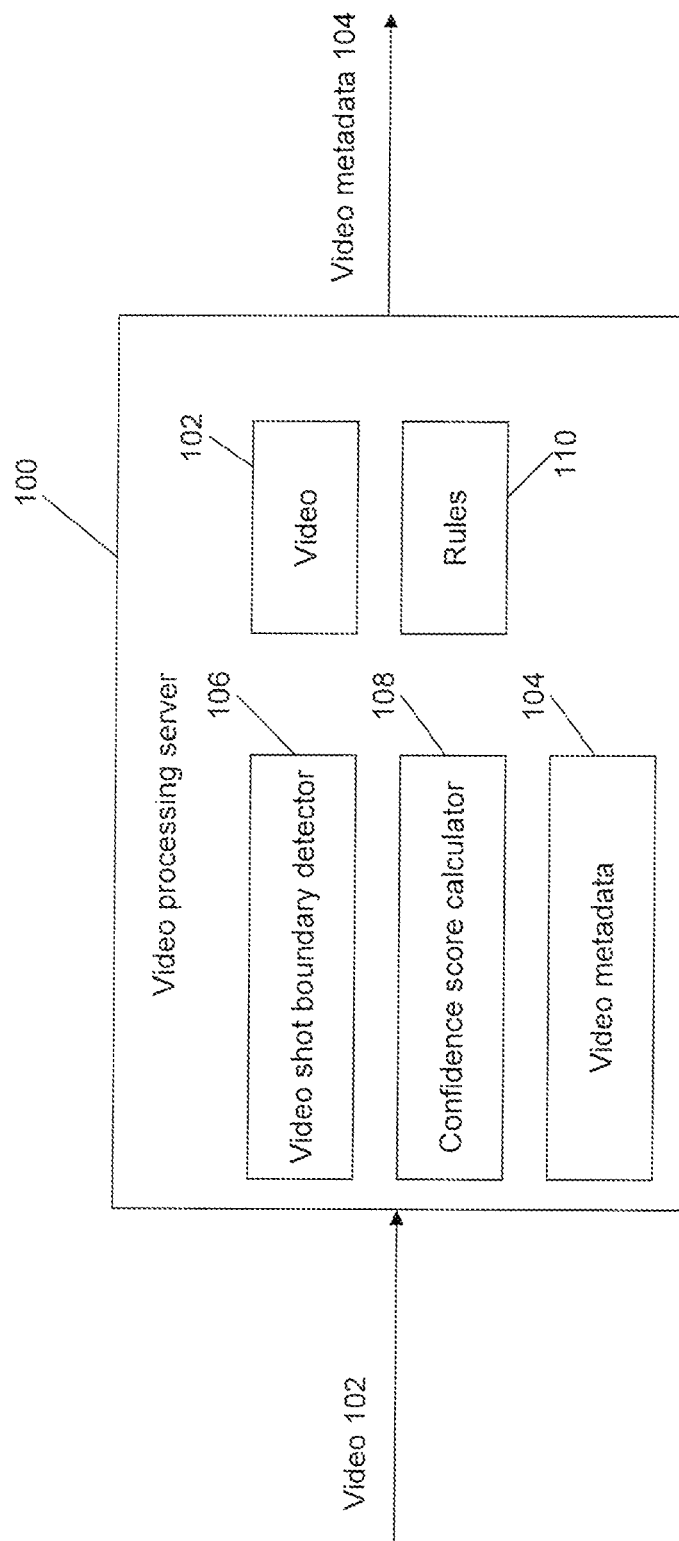
FIG. 1 is a diagram of a video processing device.

FIG. 1 is a schematic diagram of an example of a video processing device 100 (e.g., a server and herein after referred to as server 100) that receives a video 102 and determines content item (e.g., ad) slots suitable for insertion of one or more content items (e.g., ads) within the video 102. The video processing server 100 generates video metadata 104 indicating the time positions of the content item (e.g., ad) slots and associated confidence scores (or weights). A higher confidence score for a content item (e.g., ad) slot indicates a lower potential for disruption to a flow of the video 102 when a content item is played at the content item slot in-stream of the video. The video metadata 104 can be used to determine or suggest, e.g., when and what content items (e.g., ads) to play when the video 102 is played.

In the description below, ads and ad slots are be used as examples of the content items and content item slots, respectively. In some examples, the video processing server 100 determines the ad slots using a two-layer process. In the first layer of video processing, the server 100 identifies video shot boundaries (or video segment boundaries). A "shot" generally refers to a sequence of video frames that was continuously shot from the same camera (or shot at multiple times and reconstructed such that the multiple shots appear as a continuous shot to the viewer). A shot may encompass pans, tilts, or zooms. For cartoons, animation, or video that includes computer generated scenes, a video shot boundary generally refers to locations in the video where there is a discontinuity from one video frame to another.

For example, a video shot boundary occurs when the video switches from one viewpoint to another of a scene, changes from showing a scene at one location to another scene at a different location, or switches from showing the face of one person to that of another person in a discussion. The video shot boundaries are potential ad slots because a video shot boundary indicates a likelihood of a transition of scenes or topics in the video 102. By comparison, the video frames within each shot (or segment) are substantially continuous from one frame to another, so it may not be suitable to place an ad within a video shot, as it may cause significant disruption to the flow of the video, resulting in a negative viewing experience.

In the second layer of video processing, the video processing server 100 determines a confidence score for each of the video shot boundaries previously identified. Although video shot boundaries are more suitable for placing ads than positions within a shot, not all video shot boundaries are suitable as ad slots. For example, a video may show several people having a discussion in a room, where the video shots switch from one person to another. It would be awkward to insert an ad at a video shot boundary where the shot changes from one person to another while still in the middle of the discussion. A better ad slot placement would be, e.g., at a video shot boundary at the end of the discussion or when the scene changes to a different room.

The video processing server 100 includes a video shot boundary detector 106 that analyzes the content of the video 102 and determines the boundaries of video shots using a video shot boundary detection algorithm. Examples of the video shot boundary detection algorithm are described in "Performance Characterization of Video Shot Change Detection Methods" by Gargi et al., IEEE Transactions on Circuits and Systems for Video Technology, vol. 10, no. 1, pages 1-13, February 2000, and "Video Segmentation via Temporal Pattern Classification" by Cooper et al., IEEE Transactions on Multimedia, vol. 9, issue 3, pages 610-618, April 2007.

In some examples, audio tracks can be analyzed to identify the audio begin and end points, which can be used to improve the accuracy of the identification of video shot boundaries. If a video has a single shot that is continuous throughout the video, such as a video clip of an interview of a person in which the camera focuses on the person for the entire video clip, then audio begin and end points can be used in lieu of video shot boundaries. In this case, an ad slot candidate may be located after the end of an audio segment and before the start of a succeeding audio segment.

The video processing server 100 can include an audio processing module that process audio associated with the video 102.

The video processing server 100 includes a confidence score calculator 108 for determining a confidence score for each of the video shot boundaries previously identified. The confidence score calculator 108 evaluates each of the video shot boundaries using a set of rules 110 to generate a confidence score (or weight) indicating the likelihood that the video shot boundary would be a good ad slot (e.g., one that, when inserted with an ad, does not cause a significant disruption to the video flow).

The video shot boundary detector 106 and the confidence score calculator 108 can be, e.g., dedicated hardware modules or software modules that are executed by a general central processing unit (CPU) or a graphics processing unit (GPU). After the confidence scores have been determined, the video processing server 100 generates video metadata 112 that has information on the positions of the ad slots within the video and the associated confidence scores. For example, the metadata 112 may indicate that the first ad slot has a confidence score of 0.5 and occurs at time 00:05:26 (i.e., 5 minutes and 26 seconds after the start of the video).

The term "video," "audio," or "media" depending on context can refer to a visual, audio, or audio-visual signal that can be perceived by a human, or an electronic signal or file that can be processed by a machine. The term "content slot" or "ad slot" refers to a period of time in which one or more content items or ads can be presented.

The video 102 can be stored or streamed in any format that can be visually perceived when played, decoded, or rendered. The video 102 may include, for example, a live or recorded television program, a live or recorded theatrical or dramatic work, a music video, a televised event (e.g., a sports event, a political event, a news event, etc.), a home-made video, a video voice mail, etc. The video 102 can be compressed or uncompressed. The video may work with various video and "container" file formats such as, for example, one or more of Macromedia's Flash Video (FLV), Microsoft's Advanced Streaming format (ASF), Windows Media Audio (WMA), Windows Media file with Audio/Video (WMV), Audio Video Interleave (AVI), DivXTM, Intel Video Technology (IVF), Quick Time Movie File Extension (MOV), MPEG, Real Media, RealAudio, RealVideo, Vivo Video (VIV), OGG, Matroska, 3gp, NUT, MXF, ratDVD, svi, etc.

An ad may be any content designed to promote a product or service, or to otherwise give public notice of some subject matter (e.g., a public service announcement, political advertising, a help wanted ad, etc.). An ad may include any combination of text, still graphics or images, moving graphics or images (e.g., video, animation), and audio. The ad may be provided by, e.g., an advertiser, a sponsor, a provider of the video, or a publisher of the video 102. One or more ads may be played at a given video shot boundary. While reference is made to an ad, other content items can be identified for placement in a video slot at a given shot boundary.

Figure 2:
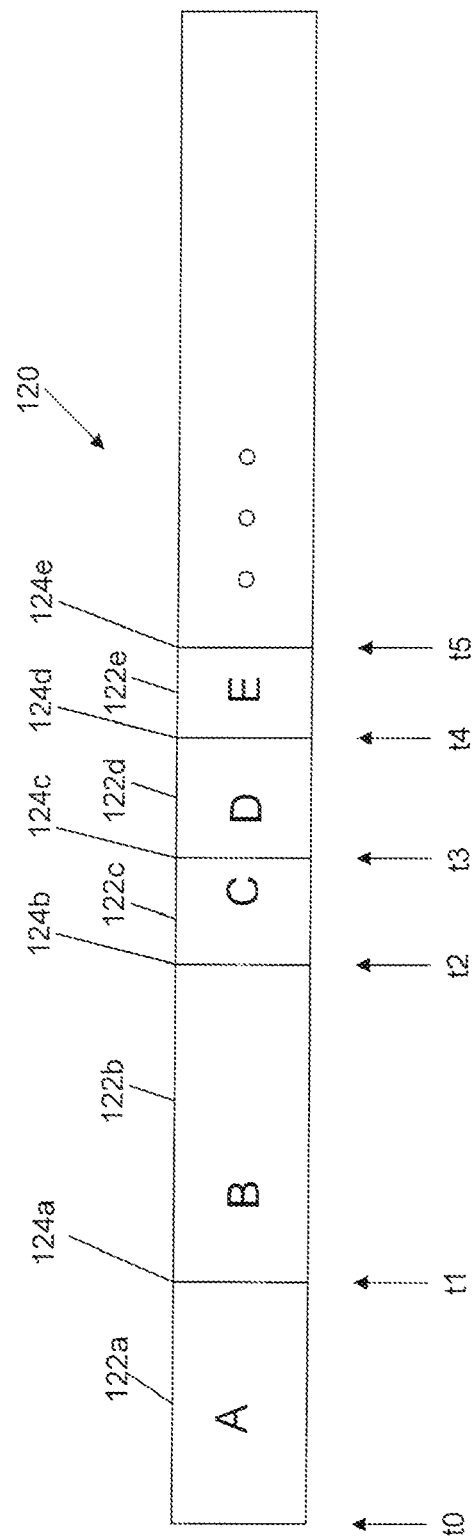
FIG. 2 is a diagram of a video divided into video shots.

FIG. 2 is a diagram of an example of a video 102 divided into video shots (or segments), including video shot A 122a, video shot B 122b, video shot C 122c, video shot D 122d, and video shot E 122e, etc. Between two video shots are video shot boundaries, e.g., 124a to 124e. The video 102 starts at time t0, and the video shot boundaries 124a to 124e occur at times t1 to t5. When the video 102 is initially received by the video processing server 100, the video 102 does not have embedded information about the locations of the video shot boundaries. The video shot boundary detector 106 analyzes the content of the video 102 and identifies the video shot boundaries (e.g., 124a to 124e). The confidence score calculator 108 evaluates each of the video shot boundaries based on the set of rules 110 to generate corresponding confidence scores.

For example, the video 102 may be evaluated using the rules below:

1. Audio continuity: If there is audio continuity across a video shot boundary, the confidence score is lowered by a predetermined amount, as the shot boundary is not a good ad slot candidate. For example, when a speaker is giving a speech, the video scene may switch from the speaker to the audience then back to the speaker, all while the speaker is speaking. It would cause significant disruption to the flow of the video to insert an ad while the speaker is in the middle of a sentence.

2. Audio silence before and after video shot change: If there is an audio silence before and after a video shot change, the confidence score is increased by a predetermined amount. The audio silence indicates a high likelihood of a story transition point in the video. Audio silence may include audio pause and audio black. Audio pause refers to a pause in audio, e.g., a pause in a conversation or music, in which the audio recording continues and there may be some background audio. Audio black refers to complete silence, e.g., when the audio recording is turned off.

3. Cut to black (or monochrome): A cut to black often indicates a natural story transition point in the video, so this may be a good ad slot candidate. The confidence score is increased by a predetermined amount when cut to black or monochrome is detected.

4. Cut activity preceding and after video shot change: A high frequency of cuts (i.e., large number of cuts per unit of time) may indicate that the same activity is shown from different viewpoints, e.g., switching from one person to another in a dialogue. If there is a high frequency of cuts around a video shot boundary, the confidence score is lowered by a predetermined amount, as this may not be a good ad slot candidate. For example, if the duration between time t2 to time t5 is 30 seconds, so that there are four cuts in 30 seconds, the frequent cut activity suggests that the video shot boundaries at times t3 and t4 may not be good ad slot candidates.

5. Similarity of preceding and succeeding video shots: In one particular example implementation, for a given video shot boundary, the video segment after the boundary is compared with the video segment that is two segments ahead of the boundary. The video segment before the boundary is also compared with the video segment that is two segments after the boundary.

For example, when evaluating the video shot boundary 124c, the video segment D 122d is compared with the segment B 122b. If the segments B and D are similar, it indicates a likelihood of the same activity shown from different viewpoints, such as in the middle of a back-and-forth series of shot changes, and is not a good ad slot candidate, so the confidence score is lowered by a predetermined amount. Similarly, the segment C 122c is compared with the segment E 122e. If the segments C and E are similar, the confidence score is lowered by a predetermined amount.

6. Use of zoom out before video shot boundary: When there is a zoom out before a video shot boundary, this may indicate the conclusion of a scene and a transition to a new scene. The confidence score is increased by a predetermined amount when zoom out before a video shot boundary is detected.

7. Volume peak before video shot boundary: When there is a volume peak before a video shot boundary, such as a crescendo in music leading to the video shot boundary, this builds up intensity of emotion and may indicate a transition to a dramatic scene. The confidence score is increased by a predetermined amount when a volume peak before a video shot boundary is detected.

8. Continuity of motion: When there is a continuity of motion before and after a shot boundary, this may indicate that the shots before and after the shot boundary are associated with, e.g., the same people or objects in movement in which the shots are obtained from different view angles. The confidence score is decreased by a predetermined amount when there is similarity in motion before and after a video shot boundary.

9. Level of motion activity: When there is a high level of motion activity before and after a shot boundary, the shot boundary may not be a good ad slot. For example, in a video having multiple shots showing different portions of a street scene having many people and cars moving about, it may be awkward to insert ads at the boundaries of those shots. The confidence score is decreased by a predetermined amount when there is a high level of motion activity before and after a video shot boundary.

Other rules for measuring continuity across video shot boundaries can be used to evaluate the video 102.

In some examples, in determining the confidence score of a video shot boundary, if a cut to black is detected at a video shot boundary, the confidence score is increased by a predetermined amount, e.g., 0.4. If an audio continuity across a video shot boundary is detected, the confidence score is decreased by a predetermined amount, e.g., 0.1. If high cut activities are detected before and after a video shot boundary, the confidence score is decreased by a predetermined amount, e.g., 0.2. If a similarity in preceding and succeeding shots is detected for a video shot boundary, the confidence score is decreased by a predetermined amount, e.g., 0.4. If an audio pause and an audio black are detected at a video shot boundary, the confidence score is increased by a predetermined amount, e.g., 0.4. If an audio pause but no audio black is detected, or if an audio black but no audio pause is detected at a video shot boundary, the confidence score is increased by a predetermined amount, e.g., 0.2. Here, an audio pause refers to a drop in volume before a shot boundary, and an audio black refers to a drop in volume after a shot boundary.

In some examples, the confidence scores of each video shot boundary is compared with a threshold value, and the video shot boundaries whose scores are higher than the threshold value are selected as ad slots. In some examples, the ad slots are sorted based on the confidence scores and used in the sorted order. The use of a threshold value in selecting ad slots can also be used in combination with the sorting of ad slots according to the confidence scores.

The rules listed above are examples. Other rules may also be used. The amount of increase or decrease to the confidence score due to each factor can be different from those described above.

In some implementations, the process for calculating the confidence score is biased towards making fewer false positive errors (identifying a segment boundary as a good ad slot when in fact it is not) while allowing more false negatives (missing some good ad slots). This reduces the chance that the video will be disrupted by inadequate ad placement, preserving a good user experience.

After the video processing server 100 processes the video 102 to identify good ad slots, the processing server 100 generates metadata that indicate the positions of the ad slots and the confidence scores. Table 1 below is an example of the video metadata, indicating ad slots at times 00:10:55, 00:17:32, and 00:48:15, with confidence scores 0.5, 0.9, and 0.2, respectively.

TABLE 1

| Video metadata | |
| --- | --- |
| Ad slot time | Confidence score |
| 00:10:55 | 0.5 |
| 00:17:32 | 0.9 |
| 00:48:15 | 0.2 |
| ... | ... |

In some examples, the video processing server 100 provides a list of video shot boundaries in the order of increasing (or decreasing) confidence scores. Table 2 below is similar to the Table 1 above, except that the ad slots are sorted according to confidence scores.

TABLE 2

| Video metadata | |
| --- | --- |
| Ad slot time | Confidence score |
| 00:17:32 | 0.9 |
| 00:10:55 | 0.5 |
| 00:48:15 | 0.2 |
| ... | ... |

Figure 3:
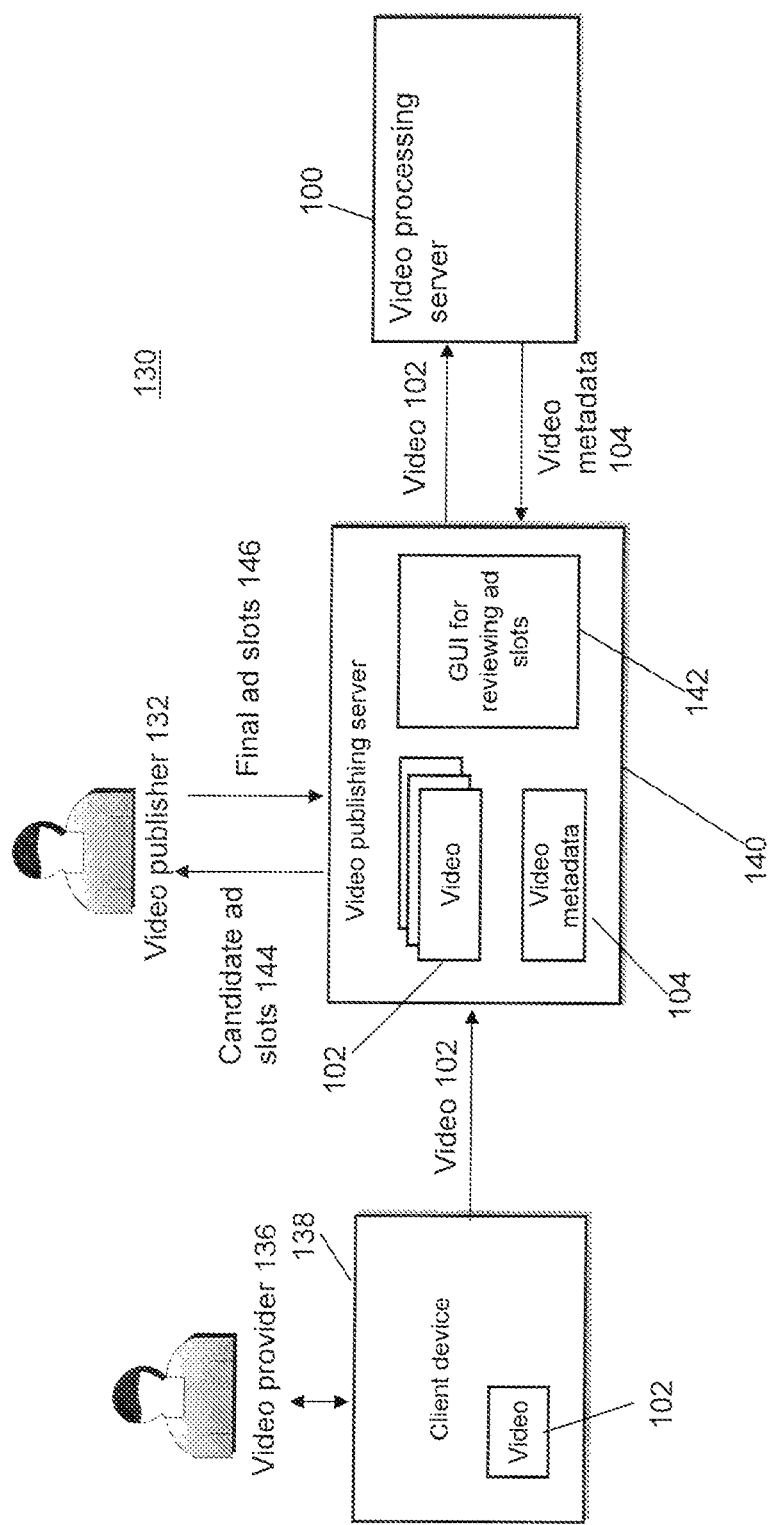
FIG. 3 is a diagram of a computer network that allows a publisher to publish videos.

FIG. 3 is a schematic diagram of an example of a computer network 130 that allows a publisher 132 to publish videos 102 with ads 134 inserted at positions that do not cause significant disruptions to the flow of the videos 102. The videos 102 can be, e.g., provided by users 136 who upload the videos 102 from a client device 138 to a video publishing server 140 operated by the publisher 132. The client device 138 can be any device capable of sending content, including desktop or laptop personal computers, mobile phones, wireless devices, game consoles, tablets, media centers, consumer electronics, personal digital assistants, television systems, media players/recorders, etc.

The video publishing server 140 sends the videos 102 to the video processing server 100 to identify potential ad slots. The video processing server 100 returns to the video publishing server 140 video metadata 104 that indicate the positions of the ad slots and the confidence scores. Though the video publishing server 140 and the video processing server 100 are shown as separate items, both can be co-located or integrated into a single device In some implementations, the video publishing server 140 provides a graphical user interface (GUI) 142 to allow the publisher 132 to review the candidate ad slot 144 identified by the video processing server 100 and make a final selection of the ad slots to identify the final ad slots 146. The video publishing server 140 or video processing server 100 stores information about the positions and confidence scores of the final ad slots 146 to a video metadata file 104.

In some examples, upon receiving information about the final ad slots 146, the video publishing server 140 may automatically select ads to insert into the ad slots 146. The video publisher server 140 may also provide suggestions to the publisher 132 regarding which ads to place at each ad slot based on the confidence scores or other criteria associated with the ad slots or the preceding or foregoing video content, for example.

Figure 4:
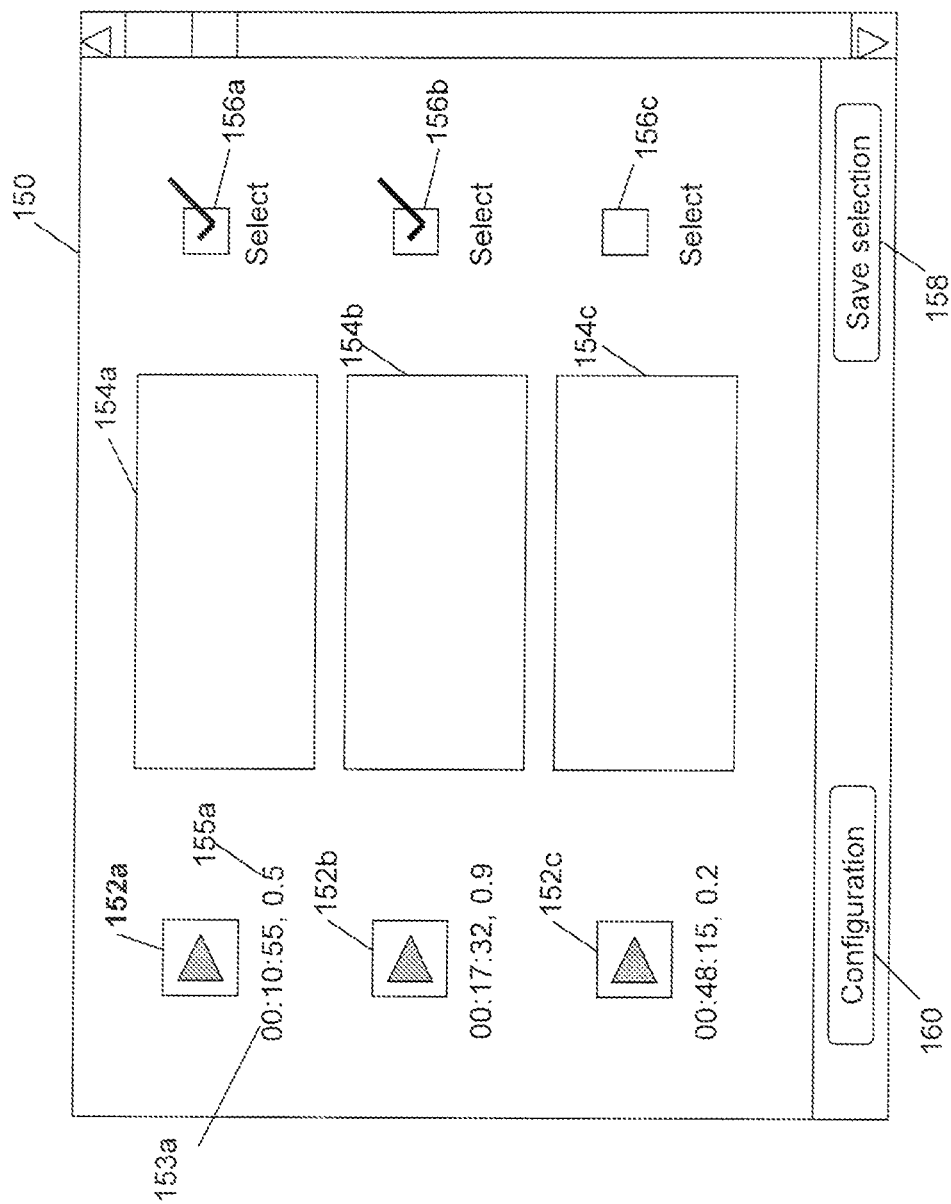
FIG. 4 is a diagram of a graphical user interface that allows a publisher to review ad slot candidates.

FIG. 4 is a diagram of an example of a GUI 150 that allows the publisher 132 to review the ad slot candidates 144 and make a final selection of ad slots. Buttons (e.g., 152a to 152c) are provided to allow the publisher 132 to select an ad slot for review. Below each button is provided timing information 153a and confidence score 155a of the ad slot. When the publisher 132 clicks on a button (e.g., 152a, 152b, or 152c), a media player (e.g., 154a, 154b, or 154c) plays a short segment of the video 102 including the ad slot to allow the publisher 132 to view the transition of video scenes at the ad slot. For example, the short segment may include 20 seconds of video before the ad slot and 20 seconds of video after the ad slot. The publisher 132 can click on a "Configuration" button 160 to adjust the time duration of the short segment of video.

For example, when the publisher 132 clicks on the button 160a, the media player 154a plays the video 102 from time 00:10:35 to time 00:11:15, allowing the publisher 132 to view 40 seconds of video before and after the ad slot. If the publisher 132 determines that the ad slot at time 00:10:55 is good, he may click on a check box 156a to select the ad slot. Similarly, after the publisher 132 reviews the ad slot at 00:17:32, if he determines that the ad slot at time 00:17:32 is good, he may click on a check box 156b. In some examples, the GUI 150 may allow the publisher 132 to revise the confidence scores 155a of the ad slots.

After the publisher 132 has reviewed the ad slots and made a final selection, the publisher 132 can click on a "Save selection" button 158 to save information about the positions and confidence scores of the selected ad slots to a video metadata file 104.

Figure 5:
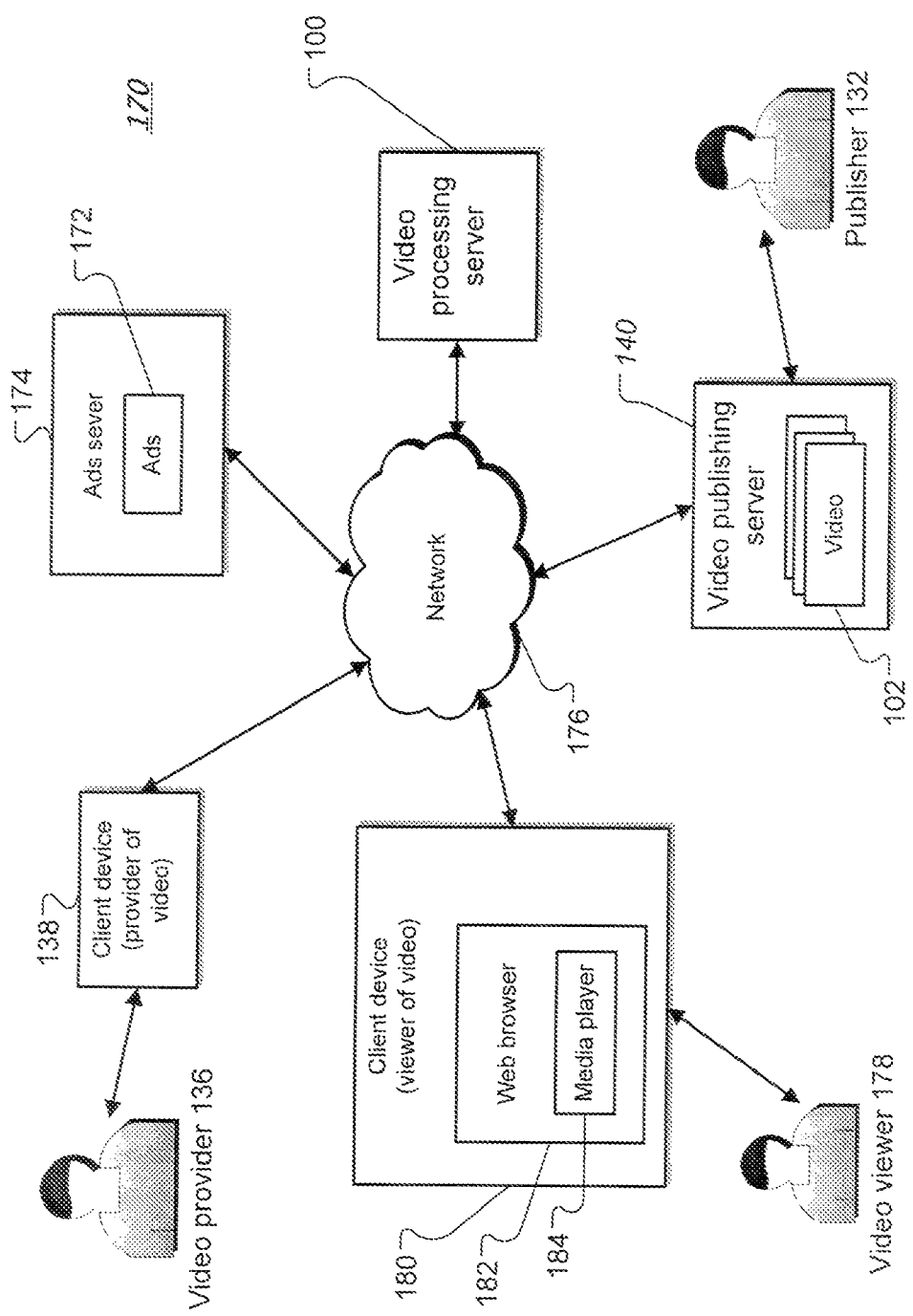
FIG. 5 is a diagram of a computer network that allows a publisher to publish videos.

FIG. 5 is a schematic diagram of an example of a computer network 170 that allows a publisher 132 to publish videos 102 to be viewed by viewers 178, in which the videos 102 includes ads 172 that are provided by an ads server 174. Similar to the computer network 130 of FIG. 3, the publisher 132 operates a video publishing server 140 that receives videos 102 from users 136 who uploads the videos 102 from client devices 138 to the video publishing server 140. The server 140 sends the videos 102 to the video processing server 100, which identifies ad slots and generates confidence scores for the ad slots, and returns video metadata 104 that includes information about the time positions and confidence scores of the ad slots. The confidence scores provides indications of the potential disruption to the flow of video 102 when ads are played at the ad slots in-stream of the video 102.

In some examples, the video publishing sever 140 automatically select ads to insert into the ad slots based on the confidence scores and mapping rules described below. In some examples, the video publisher server 140 may provide suggestions to the publisher 132 regarding which ads to place at each ad slot based on the confidence scores and the mapping rules. In some examples, the video and associated metadata are provided to advertisers to allow the advertisers to determine which ads to place at the ad slots.

The ads 172 can be classified based on type, such as whether the ad includes a higher percentage (e.g., in terms of time period) of still image(s), video(s), or text. The ads 172 can also be classified based on length of time, e.g., ads that are 10 seconds or less, ads that are 10 to 20 seconds, and ads that are 20 to 30 seconds, etc.

A mapping table can be provided to map different confidence scores to different types or classifications of ads. For example, text ads (i.e., ads that include only text) may cause less disruption to the video flow than still image ads (i.e., ads that include only still images), which in turn may cause less disruption to the video flow than video ads. Text or still image ads may be inserted at ad slots having lower confidence scores, and video ads may be inserted at ad slots having higher confidence scores. For example, confidence scores 0 to 0.1 may be mapped to text ads, confidence scores 0.11 to 0.3 may be mapped to still image ads, and confidence scores 0.31 to 1 may be mapped to video ads.

For example, an ad having a shorter time length may cause less disruption to the video flow than an ad having a longer time length. Ads having shorter time lengths may be inserted at ad slots having lower confidence scores, and ads having longer time lengths may be inserted at ad slots having higher confidence scores. Multiple ads having a longer combined time length may be inserted at an ad slot having a higher confidence score.

For example, an ad whose content is more relevant to the video content may cause less disruption to the video flow. Ads having contents more relevant to the video content may be inserted at ad slots having lower confidence scores, and ads having contents less relevant to the video content may be inserted at ad slots having higher confidence scores.

For example, an ad whose content is more relevant to the targeted audience of the video may cause less disruption to the video flow. For example, for a video intended for viewing by children, inserting ads related to children toys may be less disruptive than inserting ads related to automobiles driven by adults. Ads having contents more relevant to the intended video audience may be inserted at ad slots having lower confidence scores, and ads having contents less relevant to the intended video audience may be inserted at ad slots having higher confidence scores.

In some examples, after ad slots of the video 102 have been determined, the video publishing server 140 generates a web page having an embedded link to the video 102, the web page including video metadata having information about positions of the ad slots. The assignment of ads to ad slots within the video 102 may not be finalized until the viewer 178 requests the video 102, or when the video 102 is scheduled to be played (e.g., through a web TV channel). Thus, different ads 172 may be inserted into the video 102 depending on when the video 102 is played. By providing a way to insert ads without significantly disrupting the video flow, the publisher 132 can generate revenue from the ads 172 without adversely affecting the viewing experience of the viewer 178.

The viewer 178 views the video 102 using a client device 180. The client device 180 may be any device capable of receiving content, including personal computers, mobile phones, wireless devices, game consoles, tablets, media centers, consumer electronics, personal digital assistants, television systems, media players/recorders, etc. The content that can be received by the client device 180 may include video and documents such as web pages. The video may be played in a media player module or application. The media player module may be a standalone application, a plug-in to another application, or instructions downloaded from another computer or device. In some examples, the media player module can be implemented using ADOBE FLASH or JAVASCRIPT.

For example, the client device 180 may include a web browser 182 having a media player 184 for viewing the video 102. The web browser 182 may receive a web page that includes an embedded video referenced within the web page by a Universal Resource Locator (URL) of the video 102. The web page may also include information about positions of ad slots. When the web browser 182 renders and displays the web page, a video player module 184 is activated. The video player module 184 retrieves the video 102 based on the URL and plays the video 102 within the displayed web page. When the media player 184 reaches the ad slots, the media player 184 requests ads 172 from the ad sever 174 and shows the ads 172 within the displayed web page.

The media player 184 can present the ads 172 in a number of ways using different visual effects. In a first example, upon reaching an ad slot, media player 184 fades out the video 102, plays the ad 172. When the ad ends, the media player 184 fades out the ad 172 and resumes the video 102. In a second example, when an ad slot is reached, the media player 184 pauses the video 102 and keeps the paused video on the screen, and overlays the ad 172 above the video. The ad 172 may, e.g., overlay a portion of the paused video 102. When the ad ends, the video 102 resumes.

In a third example, upon reaching an ad slot, the video 102 is paused and reduced in size to a fraction of the screen or browser area, and the ad 172 is played at full size of the screen or browser area. This is similar to having a picture-in-picture function, allowing the viewer 178 to see where the video 102 paused while watching the ad. In cases where there is little activity in the video 102, the video 102 may continue to play at the reduced size while the ad is played at the normal size. When the ad ends, the video 102 resumes and is played at the normal size.

In a fourth example, upon reaching an ad slot, the media player 184 fades down the audio associated with the video 102 and fades in the ad 172. Near the end of the ad 172, the ad is faded out, the video 102 resumes, and the audio associated with the video 102 returns to normal volume.

In a fifth example, upon reaching an ad slot, the media player 184 fades down the audio associated with the video 102 and fades in the ad 172, similar to the fourth example. Near the end of the ad 172, the ad is faded out, and the video 102 resumes by repeating a short segment (e.g., 0.5 second) of the video 102 prior to the ad slot. For example, when the audio fades out before the ad begins, sometimes the last word of a sentence may be faded out and not audible. Repeating a short segment of the video 102 and associated audio allows the viewer 178 to pick up whatever was faded out before the ad 172 was played. The ads may be presented in different ways, such as those described above, based on the confidence scores. For example, if the confidence score of an ad slot is high, the ad 172 may be played without fade in or fade out effects. On the other hand, if the confidence score is low, indicating there is a higher likelihood of disruption to the video when the ad is played, fade in and fade out effects may be used to reduce the disruption.

The video processing server 100, the video publishing sever 140, the ads sever 174, the client device 138 (provider of video), and the client device 180 (viewer of video) are connected through one or more networks 176, which may include, without limitation, local area networks (LAN), wide-area networks (WAN), wired or wireless networks, or the public Internet, etc.

Figure 6:
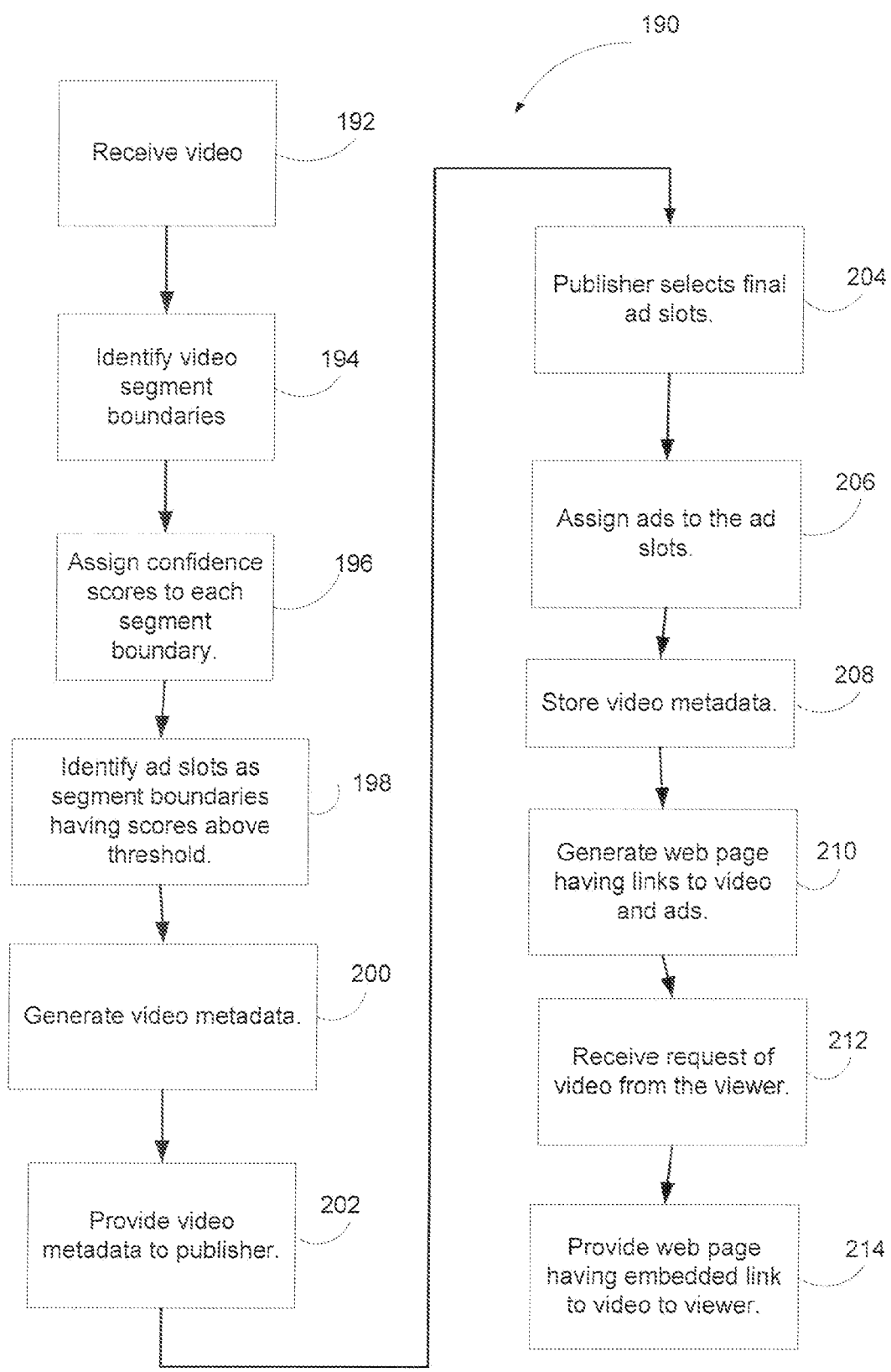
FIG. 6 is a diagram of a process for processing a video.

FIG. 6 is a flow diagram of an example of a process 190 for processing a video, e.g., the video 102 by the computer network 170 (FIG. 5). The process 190 includes the following steps:

Step 192: A video 102 is received. For example, the video 102 may be received by the video processing server 100. The video 102 may be uploaded by a video provider 134 to the video publishing server 140, and the video publishing server 140 sends the video 102 to the video processing server 100. Alternatively, the video processing server 100 may use a web crawler to find the video 102 on the Internet.

Step 194: Video shot boundaries are identified. For example, the video processing server 100 may identify the video shot boundaries (e.g., 124a to 124e of FIG. 2).

Step 196: Each video shot boundary is evaluated and confidence scores are assigned to each shot boundary. For example, the video processing server 100 may evaluate the video shot boundaries and determine the confidence scores for each boundary.

Step 198: Video shot boundaries whose confidence scores are above a threshold are selected as ad slots. For example, the video processing server 100 may compare the confidence scores of the video shot boundaries with a threshold to identify ad slots.

Step 200: Video metadata are generated. The video metadata include information about positions of ad slots and corresponding confidence scores. For example, the video processing server 100 may generate the video metadata 104.

Step 202: Video metadata are provided to the publisher 132. For example, the video processing server 100 may provide the metadata to the video publishing server 140 that is accessible to the publisher 132.

Step 204: Optionally, the publisher 132 reviews the video 102 and ad slots, and makes a final selection of the ad slots. The video metadata is stored in a storage device. For example, the video processing sever 140 provides a GUI 142 for allowing the publisher 132 to review the video 102 and select the ad slots.

Step 206: Ads 172 are assigned to the ad slots. For example, the publisher 132 uses the video publishing server 140 to assign the ads to the ad slots. Alternatively, advertisers can assign ads to the ad slots.

Step 208: Video metadata are stored in a storage device. For example, the metadata are stored in a storage device at the video publishing server 140.

Step 210: A web page including the video metadata is generated. The metadata includes the URL of the video 102, the positions of the ad slots, and the URLs of the ads corresponding to the ad slots. For example, the video publishing server 140 generates the web page.

Step 212: A request for the video 102 is received from a viewer. For example, the video publishing server 140 receives a request from the client device 180 accessible to the viewer 178.

Step 214: The video 102 is delivered to the viewer 178, and the video 102 is played with ads inserted in the ad slots. For example, the video publishing sever 140 sends the web page associated with the video 102 to the client device 180 of the viewer 178. The media player 184 at the client device 180 plays the video 102 with the ads 172.

Figure 7:
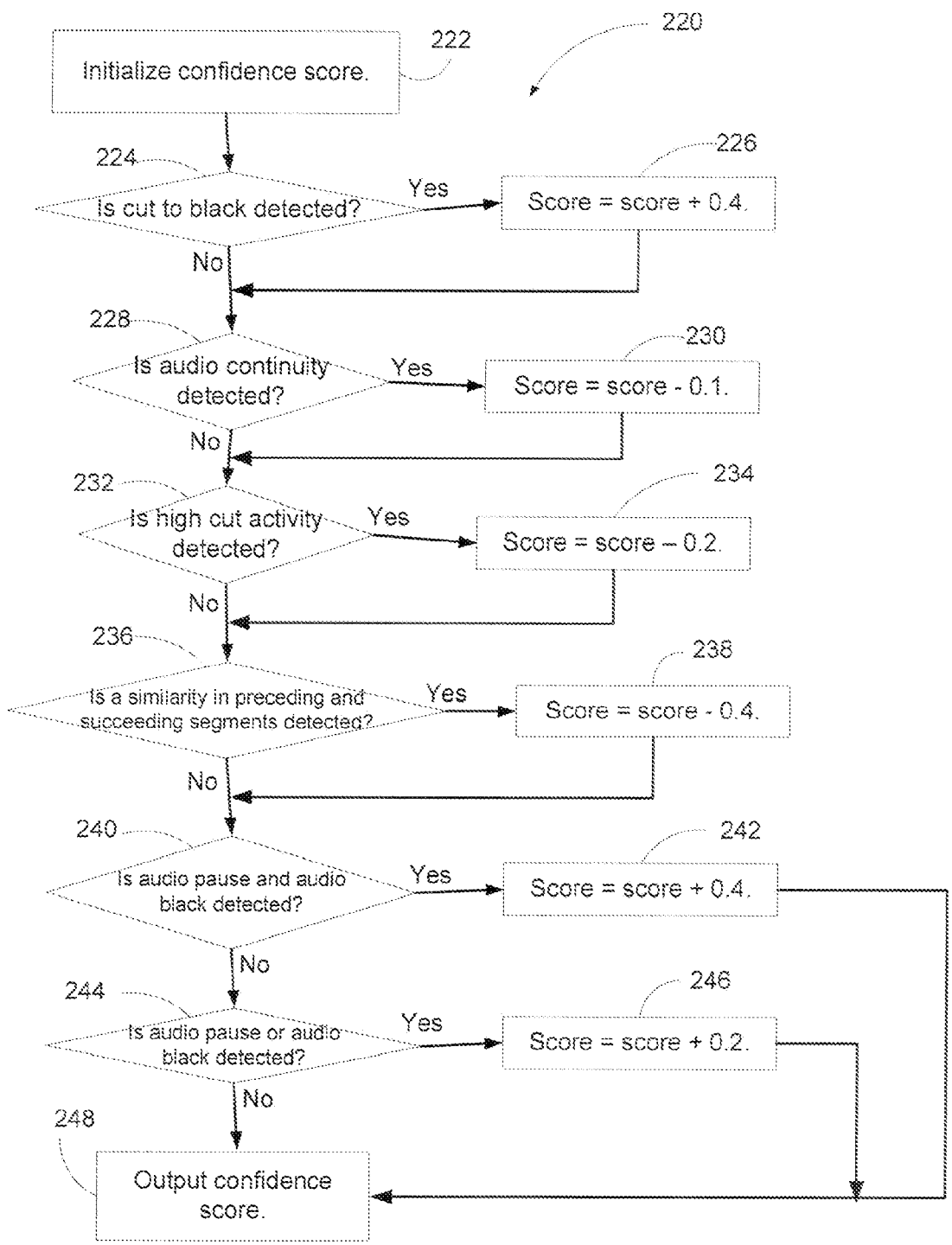
FIG. 7 is a diagram of a process for determining the confidence score of a video shot boundary.

FIG. 7 is a flow diagram of an example of a process 220 for determining the confidence score of a video shot boundary. The process 220 includes the following steps:

Step 222: The confidence score is initialized, e.g., to zero.

Step 224: The video shot boundary is evaluated to determine whether there is a cut to black before or after the boundary.

Step 226: The confidence score is increased by a predetermined amount, e.g., 0.4 if cut to black is identified.

Step 228: The video shot boundary is evaluated to determine whether there is audio continuity across the boundary.

Step 230: The confidence score is decreased by a predetermined amount, e.g., 0.1 if an audio continuity across the boundary is identified.

Step 232: The video shot boundary is evaluated to determine whether there is a high frequency of cuts near the boundary.

Step 234: The confidence score is decreased by a predetermined amount, e.g., 0.2 if a high frequency of cuts is identified.

Step 236: The video shot boundary is evaluated to determine whether there is a similarity in preceding and succeeding shots.

Step 238: The confidence score is decreased by a predetermined amount, e.g., 0.4 if there is a similarity in the preceding and succeeding shots.

Step 240: The video shot boundary is evaluated to determine whether there is an audio pause and an audio black at the boundary.

Step 242: The confidence score is increased by a predetermined amount, e.g., 0.4 if both an audio pause and an audio black are identified. The process 200 jumps to step 248, in which the confidence score is output and the process 220 ends.

Step 244: If audio pause and audio black do not both occur, the video shot boundary is evaluated to determine whether there is an audio pause at the boundary.

Step 246: The confidence score is increased by a predetermined amount, e.g., 0.2 if an audio pause or an audio black is identified. The process 220 jumps to step 248, in which the confidence score is output and the process 220 ends.

Step 248: The confidence score is output and the process 220 ends.

In the example shown in FIG. 5, the video publishing server 140 accumulates videos 102 uploaded by users 136 (video providers) or obtains the video 102 using other means. The video publishing sever 140 communicates with the video processing server 100 to process the video 102 to identify candidate ad slots. The final video metadata 104 is stored at the video publishing server 140.

In the example in FIG. 1, the video processing server 100 can use a web crawler to find videos on the Internet and identify suitable ad slots in the videos. The video processing server 100 generates video metadata 104 having information about the positions of the ad slots and associated confidence scores, and stores the metadata 104 in a database. The database may include an index to all the videos 102 that have been processed. When a third party wishes to insert ads into a video 102, the third party can contact the video processing server 100 to look up the index and obtain relevant video metadata 104 from the database.

Figure 8:
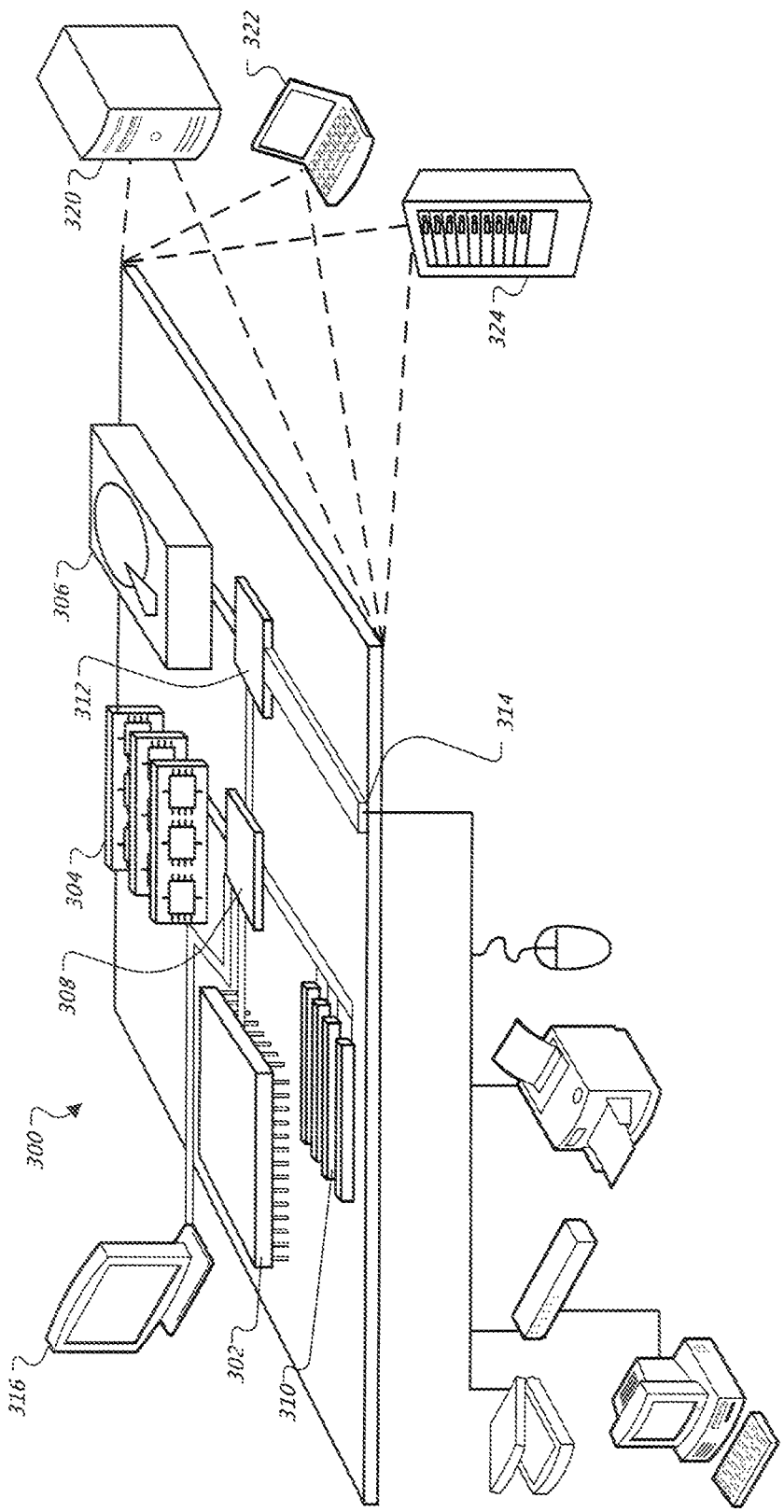
FIG. 8 is a diagram of a general computing device.

FIG. 8 is a schematic representation of an example of a general computing device 300 that can be used as, e.g., the video processing server 100, the ads sever 174, the video publishing server 140, the client device 138, or the client device 180. The computing device 300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, a multi-processor system, a peer-to-peer network, a grid computing infrastructure, or an ad hoc peer-to-peer network).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, memory on processor 302, or a propagated signal.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, IEEE 1394, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Each of such devices (e.g., standard server, rack server system, personal computer, laptop computer) may contain one or more of computing device 300, and an entire system may be made up of multiple computing devices 300 communicating with each other.

In some examples, the client devices 136 and 180 can be, e.g., portable computing devices.

Figure 9:
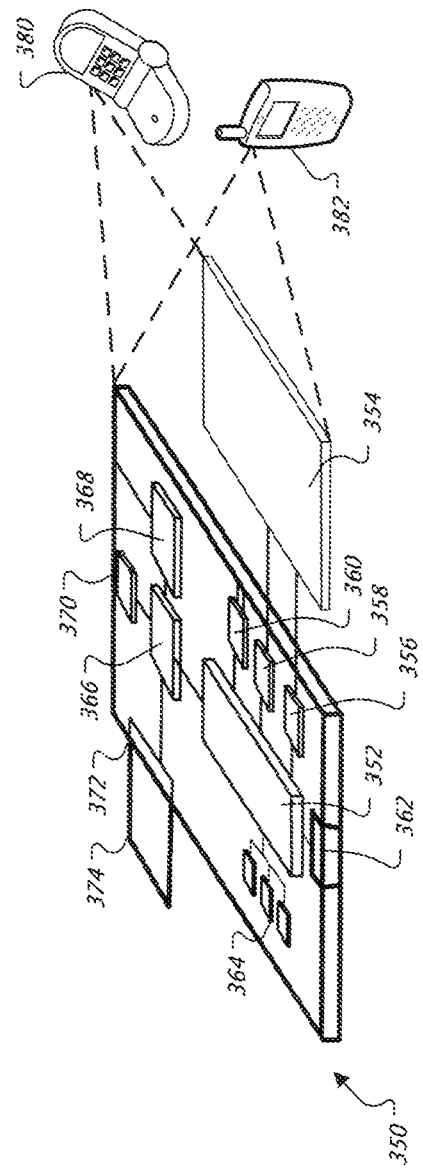
FIG. 9 is a diagram of a general portable computing device.

FIG. 9 is a schematic representation of an example of a general portable computing device 350 that includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT (Thin-Film-Transistor Liquid Crystal Display) display or an OLED (Organic Light Emitting Diode) display, or other appropriate display technology. The display interface 356 may include appropriate circuitry for driving the display 354 to present graphical and other information to a user. The control interface 358 may receive commands from a user and convert them for submission to the processor 352. In addition, an external interface 362 may be provide in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, memory on processor 352, or a propagated signal that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, such as a CRT (cathode ray tube) or LCD (liquid crystal display) monitor, for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, in the first layer of video processing, characteristics of the video other than video shot boundaries may be detected. The second layer of video processing may evaluate the identified characteristics and generate confidence scores. The video processing server 100 may provide video metadata that includes information about the positions of the ad slots but does not include the confidence scores.

When the ad slots and the confidence scores have been identified, ads may be modified based on the confidence scores. For example, if an advertiser wishes to add an ad to a video, but all of the ad slots in the video have low confidence scores, the system may provide a suggestion to the advertiser to modify the ad, or the system may modify the ad, such as by using fade in and fade out effects on the ad, and let the advertiser decide whether the use the modified version of the ad. Alternatively, the system may modify video frames or audio segments, such as by applying fade out and fade in effects to video frames before and after, respectively, an ad slot.

Ads can be assigned to the ad slots of a video 102 after the ad slots have been identified and well in advance of the time that the ads are played. The video publishing server 140 generates a web page having an embedded link to the video 102, the web page including video metadata having information about positions of the ad slots and the URLs of the ads 172 that correspond to the ad slots.

If the video 102 does not have video shot boundaries (such as a video of a speech where one camera is turn-on continuously), or where all the video shot boundaries have low confidence scores, one or more audio tracks associated with the video 102 may be analyzed to find audio pauses, speech pauses, or music pauses. An audio pause can be identified by finding places where the ratio of the current audio volume versus the average volume is below a threshold. A speech gap detector may be used to analyze the audio to identify pauses or gaps in speech portions of the audio. For example, in a video of a lecturer giving a speech, a pause in speech may indicate the end of a sentence and can be a potential ad slot. Similarly, a music gap detector may be used to analyze the audio to identify pauses or gaps in music portions of the audio to find potential ad slots.

The confidence scores or weights of ad slots can be modified based on rules that are independent of the potential disruption to the flow of the media. For example, the confidence scores can be modified based on the positions of the ad slots. When viewing video clips posted on the Internet, many viewers view only portions near the beginning of the videos and skip the remainder. Thus, ad slots that are near the beginning of the video may be adjusted higher by a predetermined percentage. For example, ad slots within 30 seconds from the beginning of the video 102 may have their confidence scores increased by, e.g., 10%.

An audio clip may be processed using a two-layer process similar to the processing of the video 102. Audio segment boundaries can be identified by identifying audio pause or audio black in the audio recording. Each audio pause or audio black is evaluated to generate a confidence score indicating the likelihood of disruption to the flow of audio if an ad is inserted at the audio pause or audio black. Rules for calculating the confidence scores may include, e.g., the length of the audio pause or audio black, the similarity of audio segments before and after the audio pause or audio black, and the frequency of audio pause or audio black, etc.

The confidence scores may be different from those described above. The GUIs may be different from those described above. The rules for determining the confidence scores may be different from those described above.

The video processing server 100 can be replaced by a media processing server that can process different types of media, e.g., video only content, audio only content, audio-visual content, e-mail, slide presentation, etc. The media may involve different senses and provide, e.g., visual, audio, olfactory, and/or tactile information. The client device 180 may be replaced by a device that is capable of rendering the different types of media that can provide different types of sensory information. For example, the client device 180 may be able to generate smells that accompany the story in the video. Playing an ad of a perfume or food product may involve emitting molecules that produce effects to mimic the smell of the perfume or food product. Determining the confidence score of an ad slot in a media may involve evaluating the potential disruption to the flow of the media as perceived by the various senses when an ad is played in-stream of the media.

The policy used to place ads in a video may be de-coupled from the detection of points of least disruption to the flow of video. For example, the weights assigned to ad slots may be modified by various means. In some examples, ad slots earlier in the video may be weighted higher to increase viewership due to known drop-off rates. In some examples, identified ad slots may be chosen to achieve equal distribution of ad slots through the video. In some examples, an advertiser may request that an ad be shown near a particular segment of the video where a product appears in the video. In this case, the closest ad slot near the particular video segment may be chosen even if its score (strength) is lower than other candidate ad slots.

Various forms of the flows shown above may be used, with steps re-ordered, added, or removed. Also, although several applications and methods have been described, it should be recognized that numerous other applications are contemplated. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
  identifying, by one or more video processing servers, a plurality of video shot boundaries in a first media, said video shot boundaries representing a plurality of content item slots;
  determining, for each of the plurality of content item slots, by the one or more video processing servers, a degree of potential disruption of flow of the first media that would be created by the insertion of a content item in each of the plurality of content item slots, the potential disruption of flow of the first media is based on one or more of:

A similarity of preceding or succeeding portions of the first media surrounding each of the plurality of content item slots;

Cut activity in the first media preceding or succeeding each of the plurality of content item slots;

Cut to black activity in the first media preceding or succeeding each of the plurality of content items, audio silence in the first media before or after each of the plurality of content items slots;

Or audio continuity across each of the plurality of content item slots in the first media;

assigning, by the one or more video processing servers, weights based on said determined degree of potential disruption to each of the plurality of content item slots;

determining, by the one or more video processing servers, a classification type for each of a plurality of content items as being a text content item, an image content item, or a video content item;

assigning, by the one or more video processing servers, a confidence score to each of the plurality of content items, the confidence score is based on an amount of disruption to the video flow caused by the classification type;

selecting, by the one or more video processing servers, at least one content item of the plurality of content items and at least one content item slot of the plurality of content item slots in the media based on an evaluation of the weights assigned to each of the plurality of content items slots, the classification type of each of the plurality of content items and the confidence score assigned to each of plurality of content item; and Generating, by the one or more video processing servers, a second media by inserting the selected at least one content item into the selected at least one content item slot of the first media.

2. The method of claim 1 wherein the media comprises a video, an audio, or both.

3. The method of claim 1 wherein the content item comprises an ad.

4. The method of claim 1 wherein the content item slots comprise ad slots.

5. The method of claim 1 wherein identifying potential content item slots comprises identifying video shot boundaries indicating changes in video shots within the media.

6. The method of claim 1 wherein identifying potential content item slots comprises identifying boundaries of audio, speech, or music within the media.

7. The method of claim 1, further comprising identifying ad slots from the potential content item slots having weights above a threshold.

8. The method of claim 1, further comprising selecting a visual effect for presenting a content item in a content item slot based on the weight associated with the content item slot.

9. The method of claim 8, further comprising applying a fade-in and/or fade-out effect when presenting a content item in a content item slot when the weight associated with the content item slot is below a threshold.

10. The method of claim 1, wherein classifying one or more content item slots including associating weights with each potential content item slot, each weight indicating a degree of potential disruption to a flow of the media when a content item is inserted in the content item slot further comprises:

evaluating discontinuity between a first video frame in the media that is before a particular content item slot and a second video frame in the media that is after the particular content item slot;

determining a weight by increasing or decreasing an initial value for the particular content item slot based on the evaluating so that the weight is higher when there is more discontinuity and lower when there is less discontinuity; and associating the determined weight to the particular content item slot.

11. The method of claim 1 wherein assigning a particular content item comprises assigning the particular content item associated with lower confidence scores to the particular selected content item slot associated with a higher weight and assigning the particular content item associated with a higher confidence score to the particular selected content item slot associated with a lower weight.

12. The method of claim 1 wherein assigning a particular content item to a selected content item slot is further based on a time duration of the particular content item.

13. The method of claim 12 wherein assigning a particular content item comprises assigning the particular content item having a longer time duration to a particular content item slot associated with a higher weights, and assigning the particular content item having a shorter time duration to a content item slot associated with a lower weight, wherein a higher weight indicates a lower degree of potential disruption to the media flow.

14. The method of claim 1 wherein classifying a particular one of the one or more content items is based at least in part on one or more percentages of text, still images, and videos in the particular content item.

15. The method of claim 10 wherein evaluating the discontinuity is performed by evaluating discontinuity of one or more criteria and wherein determining the weight further comprises:

for each of the one or more criteria, increasing or decreasing a previous weight for the particular content item slot based on the evaluating so that once each of the one or more criteria has been evaluated, the determined weight is higher when there is more discontinuity and lower when there is less discontinuity.

16. The method of claim 1 wherein assigning a particular content item to a particular selected content item slot is further based on a similarity level between the particular content item and media content preceding the particular selected content item slot.

17. The method of claim 16 wherein assigning a particular content item further comprises assigning the particular content item having a higher similarity to the media content to a particular selected content item slot associated with a lower weight, and assigning the particular content item having a lower similarity to the media content to a particular selected content item slot associated with a higher weight, wherein a higher weight indicates a lower degree of potential disruption to the media flow.

18. The method of claim 1, further comprising generating media metadata having information about positions of the content item slots within the media and the weights associated with the content item slots.

19. The method of claim 1, further comprising receiving the media from a source, and providing information about positions of the potential content item slots and associated confidence scores to the source.

20. The method of claim 1, further comprising modifying the weights based on a rule independent of the potential disruption to the flow of the media.

21. The method of claim 1, further comprising increasing a weight of a content item slot when the content item slot is within a predetermined time period from the beginning of the media.

22. The method of claim 1, further comprising modifying a weight of a content item slot based on a time proximity of the content item slot relative to a chosen time point in the video.

23. The method of claim 1, further comprising storing media metadata in a storage device, the metadata having information about positions of the content item slots and the weights associated with the content item slots.

24. An apparatus comprising:
A storage device to store a video; and
A processor that performs the steps of:
   identifying, by one or more video processing servers, a plurality of video shot boundaries in a first media, said video shot boundaries representing a plurality of content item slots;
   determining, for each of the plurality of content item slots, by the one or more video processing servers, a degree of potential disruption of flow of the first media that would be created by the insertion of a content item in each of the plurality of content item slots, the potential disruption of flow of the first media is based on one or more of:
      a similarity of preceding or succeeding portions of the first media surrounding each of the plurality of content item slots;
      cut activity in the first media preceding or succeeding each of the plurality of content item slots;
      cut to black activity in the first media preceding or succeeding each of the plurality of content items, audio silence in the first media before or after each of the plurality of content items slots; or audio continuity across each of the plurality of content item slots in the first media;
   assigning, by the one or more video processing servers, weights based on said determined degree of potential disruption to each of the plurality of content item slots;
   determining, by the one or more video processing servers, a classification type for each of a plurality of content items as being a text content item, an image content item, or a video content item;
   assigning, by the one or more video processing servers, a confidence score to each of the plurality of content items, the confidence score is based on an amount of disruption to the video flow caused by the classification type;
   selecting, by the one or more video processing servers, at least one content item of the plurality of content items and at least one content item slot of the plurality of content item slots in the media based on an evaluation of the weights assigned to each of the plurality of content items slots, the classification type of each of the plurality of content items and the confidence score assigned to each of plurality of content item; and
   generating, by the one or more video processing servers, a second media by inserting the selected at least one content item into the selected at least one content item slot of the first media.

25. The apparatus of claim 24 wherein the content items comprise ads.

26. The apparatus of claim 24 wherein the content item slots comprise ad slots.

* * * * *